Patented Oct. 4, 1932

1,880,490

UNITED STATES PATENT OFFICE

GEORG RÖSCH, OF COLOGNE-MULHEIM, GERMANY, ASSIGNOR TO GENERAL ANILINE WORKS, INC., OF NEW YORK, N. Y., A CORPORATION OF DELAWARE

VAT DYESTUFFS OF THE ANTHRAQUINONE SERIES

No Drawing. Application filed July 28, 1930, Serial No. 471,424, and in Germany July 30, 1929.

The present invention relates to a process of manufacturing vat dyestuffs of the anthraquinone series and to new products obtainable by said process.

In accordance with the invention new vat dyestuffs of the anthraquinone series are obtainable by converting phenylene or napthylene-di (1-thioanthraquinone-2-carboxylic acids) each possessing a free ortho position to the sulfur in the benzene or naphthalene nucleus and answering the general formula:

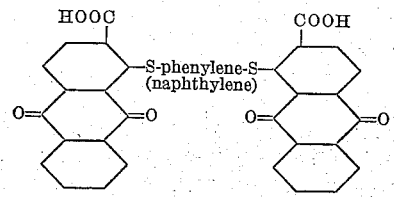

wheren the phenylene or naphthalene nucleus may be substituted by monovalent substituents, into dithioxanthones of the general formula:

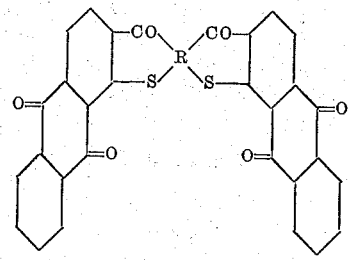

in which R signifies a benzene or naphthalene nucleus which may be substituted by monovalent substituents, such as halogen atoms, alkoxy groups or the like.

The condensation can be effected by means of acid condensing agents, that is to say, substances which are either acids or which form acids with water, as for example, by heating with phosphorus penthachloride in a solvent like nitrobenzene with or without the addition of a little concentrated sulfuric acid or by heating with concentrated sulfuric acid alone. The phenylene or naphthylene-di (1-thioanthraquinone-2-carboxylic acids) can be obtained by causing 1-chloro-anthraquinone-2-carboxylic acids or 1-diazo-anthraquinone-2-carboxylic acids to act on dimercaptans of the benzene or naphthalene series. The new dyestuffs form golden yellow to red orange powders, soluble in strong sulfuric acid with orange to red colorations and dye cotton from violet to green hydrosulfite vats orange-colored to brownish-red shades possessing a considerably greater affinity for the fiber than the hitherto known anthraquinone mono-or-di-thioxanthones, they are generally distinguished by great clarity of shade and good fastness properties.

The invention is illustrated by the following examples without being limited thereto.

*Example 1*

(a)

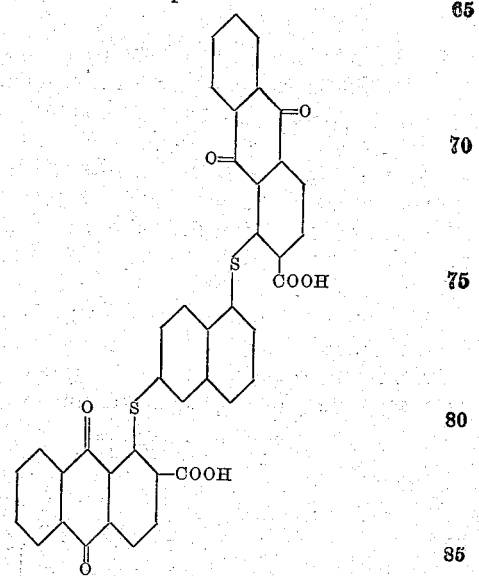

57.3 parts by weight of 1-chloroanthraquinone-2-carboxylic acid, 19.2 parts by weight of naphthalene-1.6-dimercaptan and 25 parts by weight of caustic alkali dissolved in 400 parts by weight of water are heated to boiling under reflux for 8 hours. The reaction mixture solidifies on cooling to a red crystalline magma. The product is dissolved with boiling water, filtered and the dipotassium salt of the formed dicarboxylic acid is separated by the addition of common salt and then filtered. The product is once again dissolved in boiling water, acidified with acetic acid, the orange colored dicarboxylic acid is filtered by suction, washed with water and dried. The yield amounts to 65 parts by weight.

The product can be recrystallized from a large quantity of nitrobenzene or from acetic anhydride. It dissolves in concentrated sulfuric acid to give first a violet black coloration, which then changes to orange.

(b)

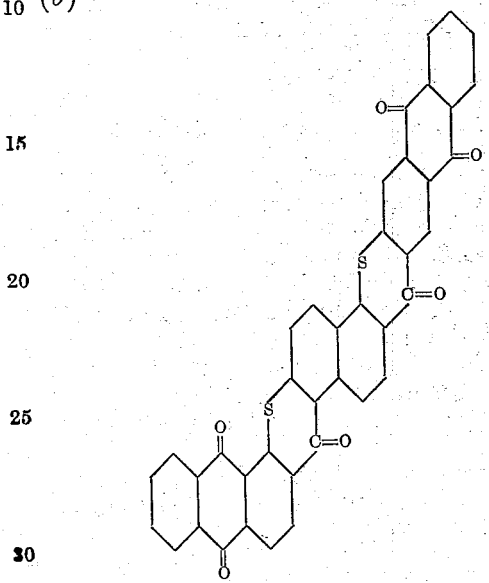

69,2 parts by weight of the dicarboxylic acid (a), 680 parts by weight of nitrobenzene and 41,7 parts by weight of phosphorus pentachloride are heated to boiling for about half an hour, whereby the dithioxanthone separates as an orange colored precipitate. After cooling the same is filtered by suction, washed with a little nitrobenzene and ether and dried. The yield amounts to 65 parts by weight. The dyestuff dissolves in concentrated sulfuric acid with an orange coloration and yields on cotton from a blue hydrosulfite vat a very clear orange after oxidation.

*Example 2*

(a)

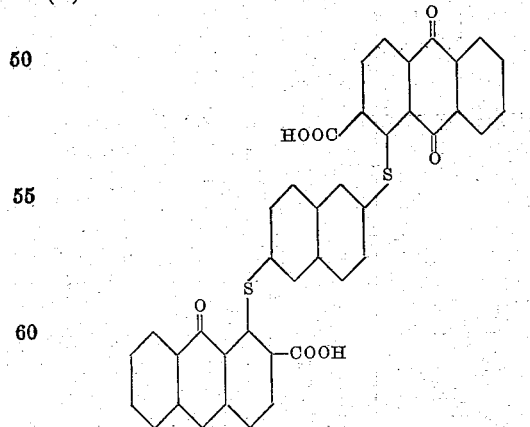

57.3 parts by weight of 1-chloroanthraquinone-2-carboxylic acid, 19.2 parts by weight of naphthalene-2.6-dimercaptan and 25 parts by weight of caustic alkali dissolved in 400 parts by weight of water are caused to react in exactly the same manner as described in Example 1 (a). An orange colored substance is obtained in a yield of 70 parts by weight. The dicarboxylic acid dissolves in concentrated sulfuric acid first with a violet coloration which then changes into reddish-orange.

(b)

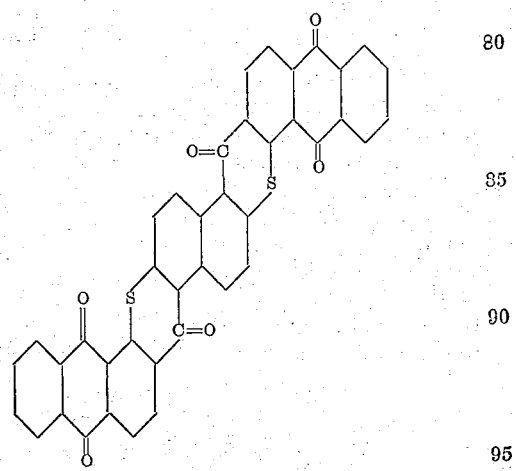

69.2 parts by weight of the dicarboxylic acid 2 (a), 680 parts by weight of nitrobenzene and 41,7 parts by weight of phosphorus pentachloride are caused to react in exactly the same manner as described in Example 1 (b). The resulting dithioxanthone is obtained as an orange-colored substance in a yield of 65 parts by weight. The dyestuff dissolves in concentrated sulfuric acid with a reddish-orange coloration and dyes cotton from a blue hydrosulfite vat a very clear reddish-orange after oxidation.

*Example 3*

(a)

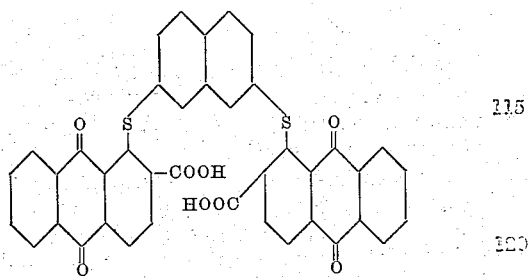

57.3 parts by weight of 1-chloroanthraquinone-2-carboxylic acid, 19.2 parts by weight of naphthalene-2.7-dimercaptan and 25 parts by weight of caustic alkali dissolved in 400 parts by weight of water are caused to react in exactly the same manner as described in Example 1 (a). An orange colored substance is obtained in a yield of 72 parts by weight. The dicarboxylic acid dissolves on heating in concentrated sulfuric acid with a reddish-violet coloration.

(b)

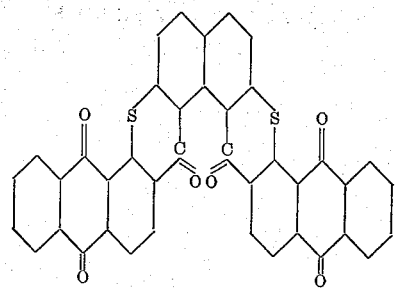

69.2 parts by weight of the dicarboxylic acid 3 (a), 680 parts by weight of nitrobenzene and 41,7 parts by weight of phosphorus pentachloride are caused to react in exactly the same manner as in Example 1 (b). The resulting dithioxanthone is a brown substance, which dissolves in concentrated sulfuric acid with a red coloration and yields on cotton from a green hydrosulfite vat a brownish-yellow shade after oxidation. It should be pointed out that ring closure towards the naphthalene nucleus may also proceed in a manner different from that indicated in the above formula. The yield amounts to 62 parts by weight.

*Example 4*

(a)

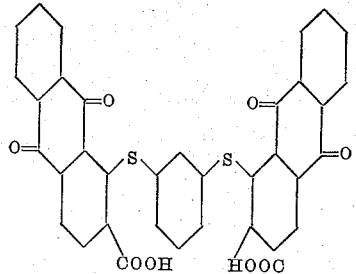

114 parts by weight of 1-chloroanthraquinone-2-carboxylic acid 28.4 parts by weight of meta phenylene dimercaptan and 50 parts by weight of caustic alkali dissolved in 400 parts by weight of water are caused to react in exactly the same manner as described in Example 1 (a). An orange colored substance is obtained in a yield of 130 parts by weight. The dicarboxylic acid dissolves in concentrated sulfuric acid with a blueish-red coloration.

(b)

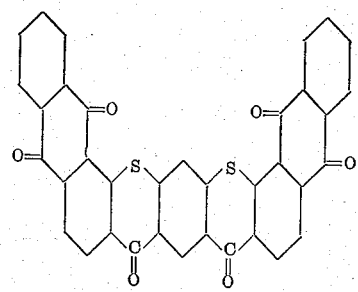

25 parts by weight of the dicarboxylic acid 4 (a) are dissolved in 500 parts by volume of hot acetic anhydride, 9 parts by weight of concentrated sulfuric acid are added and heating to boiling is effected for half an hour. The resulting product is then filtered by suction while hot and washed with glacial acetic acid in ether; the dithioxanthone is obtained as an orange colored powder, which dissolves in concentrated sulfuric acid with an orange coloration and yields on cotton from a violet hydrosulfite vat a yellowish orange shade after oxidation.

Similar dyestuffs have been obtained from 1-chloroanthraquinone-2-carboxylic acid as the one component and compounds of the following formula as the second component.

| Component | Properties of the dyestuff |
|---|---|
| (1) ![naphthalene with SH groups at 1 and 5 positions] | Orange-red powder soluble in strong sulfuric acid with an orange coloration dyeing cotton from a green alkaline hydrosulfite vat red-orange shades. |
| (2) ![naphthalene with SH groups at 2 and 6 positions] | Orange powder, soluble in strong sulfuric acid with a reddish-brown coloration, dyeing cotton from a green alkaline hydrosulfite vat yellow-orange shades fast to exposure and light. |
| (3) ![naphthalene with SH at 3,7 and Cl at 1,5] (obtainable from 1.5-naphthylene diamino-3.7-disulfonic acid by Sandmeyer's reaction and converting the SO₃H groups into SH groups according to known methods.) | Orange colored powder, dyeing cotton from a green alkaline hydrosulfite vat reddish-brown shades. |
| (4) ![naphthalene with SH at 1,5 and Cl at 3,7] (obtainable by treating 2.6-dimercaptonaphthylene with chlorine in chlorobenzene and reduction of the disulfide being firstly formed with Zn and HCl.) | Dyes cotton from an olive colored vat yellowish-brown shades. |

I claim:—

1. The compounds of the probable formula:

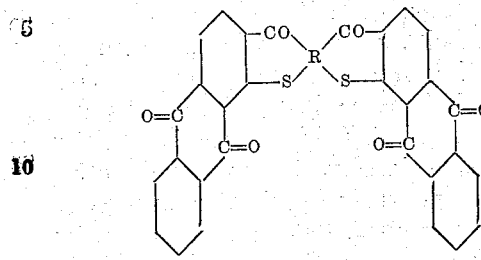

wherein R means a benzene or naphthalene nucleus which may be substituted by halogen atoms, said compounds forming golden-yellow to red-orange powders, soluble in strong sulfuric acid with orange to red colorations, dyeing cotton from a violet to green hydrosulfite vat orange to brownish-red shades of good fastness properties.

2. The compounds of the probable formula:

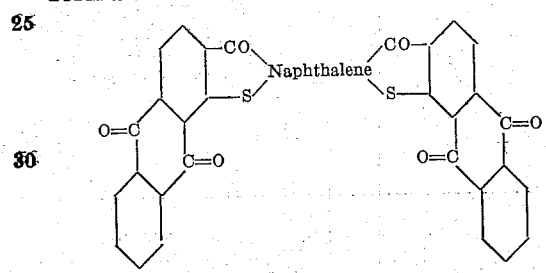

said compounds forming golden-yellow to red-orange powders, soluble in strong sulfuric acid with orange to red colorations, dyeing cotton from a violet to green hydrosulfite vat orange to brownish-red shades of good fastness properties.

3. The compound of the probable formula:

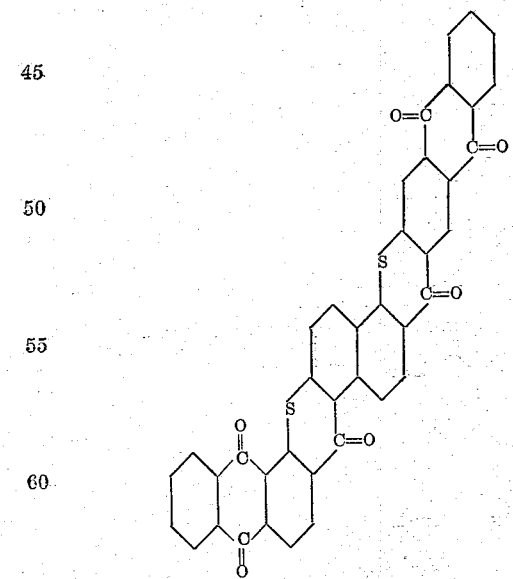

said compound dissolving in strong sulfuric acid with an orange coloration, dyeing cotton from a blue alkaline hydrosulfite vat clear orange shades.

In testimony whereof, I affix my signature.

GEORG RÖSCH.